United States Patent
Raggi et al.

(10) Patent No.: US 9,897,222 B2
(45) Date of Patent: Feb. 20, 2018

(54) MATERIAL SUITABLE FOR THE MANUFACTURE OF VALVE SHUTTERS FOR THE CYLINDERS OF THE RECIPROCATING COMPRESSORS, AND VALVES THUS OBTAINED

(71) Applicant: DOTT. ING. MARIO COZZANI S.r.l., Arcola (IT)

(72) Inventors: Andrea Raggi, Lerici (IT); Massimo Schiavone, Carrara (IT); Luigi Torre, Narni (IT); Alessandro Vollonnino, La Spezia (IT); Josè M. Kenny, Terni (IT); Andrea Terenzi, Terni (IT)

(73) Assignee: DOTT. ING. MARIO COZZANI S.R.L., Province of la Spezia (IT)

( * ) Notice: Subject to any disclaimer, the term of this patent is extended or adjusted under 35 U.S.C. 154(b) by 70 days.

(21) Appl. No.: 14/646,172

(22) PCT Filed: Nov. 20, 2013

(86) PCT No.: PCT/IB2013/060278
§ 371 (c)(1),
(2) Date: May 20, 2015

(87) PCT Pub. No.: WO2014/080346
PCT Pub. Date: May 30, 2014

(65) Prior Publication Data
US 2015/0300515 A1   Oct. 22, 2015

(30) Foreign Application Priority Data

Nov. 21, 2012   (IT) ............... GE2012A0112

(51) Int. Cl.
*F16K 27/00*   (2006.01)
*F16K 25/00*   (2006.01)
(Continued)

(52) U.S. Cl.
CPC ............ *F16K 25/005* (2013.01); *C08K 3/34* (2013.01); *C08K 7/06* (2013.01); *F16K 27/00* (2013.01)

(58) Field of Classification Search
CPC ......... F16K 25/005; F16K 27/00; C08K 7/06; C08K 3/34
(Continued)

(56) References Cited

U.S. PATENT DOCUMENTS

| 3,536,094 A | 10/1970 | Manley, Jr. |
| 4,695,602 A * | 9/1987 | Crosby .................. C08K 7/02 251/368 |

(Continued)

FOREIGN PATENT DOCUMENTS

EP   1 221 554   7/2002

OTHER PUBLICATIONS

International Search Report for PCT/IB2013/060278 dated Mar. 26, 2014.
(Continued)

*Primary Examiner* — John Bastianelli
(74) *Attorney, Agent, or Firm* — Marvin Petry; Stites & Harbison PLLC

(57) ABSTRACT

Material suitable for the manufacture of valve shutters for the cylinders of the reciprocating compressors comprising a thermoplastic matrix consisting of polyether ether ketone (PEEK) or polyether imide (PEI) or mixtures thereof filled with glass and/or carbon fibers, characterized by comprising, in percentages by weight at least one of the following inorganic nano-particles, or a mixture thereof: 4-30% of wollastonite, 4-30% of metal oxide, 4-30% of carbon nano-fibers, 4-30% of sepiolite, 4-30% of mixtures of silica and alumina, 4-30% of fluoro-mica for a total quantity of 4-30% of nano-particles.

13 Claims, 1 Drawing Sheet

(51) Int. Cl.
*C08K 3/34* (2006.01)
*C08K 7/06* (2006.01)

(58) Field of Classification Search
USPC .......................................................... 251/368
See application file for complete search history.

(56) References Cited

U.S. PATENT DOCUMENTS

| | | | | |
|---|---|---|---|---|
| 6,229,675 | B1* | 5/2001 | Tanaka | H01F 5/02 360/265 |
| 6,581,632 | B2* | 6/2003 | Walpole | F04B 39/1053 137/512.1 |
| 7,255,328 | B2* | 8/2007 | Hunter | F16K 3/02 137/375 |
| 2002/0123282 | A1* | 9/2002 | McCarthy | C08F 114/18 442/180 |
| 2003/0030226 | A1 | 2/2003 | Durham | |
| 2004/0157996 | A1* | 8/2004 | Gallucci | B82Y 30/00 525/132 |
| 2005/0061280 | A1* | 3/2005 | Jialanella | C08G 59/66 123/90.38 |
| 2006/0074165 | A1* | 4/2006 | Gelissen | B41M 5/267 524/430 |
| 2007/0163655 | A1* | 7/2007 | Hunter | F16K 3/02 137/375 |
| 2008/0139722 | A1* | 6/2008 | Shefelbine | B82Y 30/00 524/413 |
| 2008/0176088 | A1* | 7/2008 | Elia | B29C 45/0013 428/454 |
| 2008/0248201 | A1* | 10/2008 | Corkery | C09D 7/1291 427/256 |
| 2009/0142585 | A1 | 6/2009 | Kobayashi et al. | |
| 2010/0324195 | A1 | 12/2010 | Williamson | |
| 2011/0094777 | A1* | 4/2011 | Swift | C08G 59/226 174/257 |

OTHER PUBLICATIONS

Written Opinion of the International Searching Authority for PCT/IB2013/060278 dated Mar. 26, 2014.

* cited by examiner

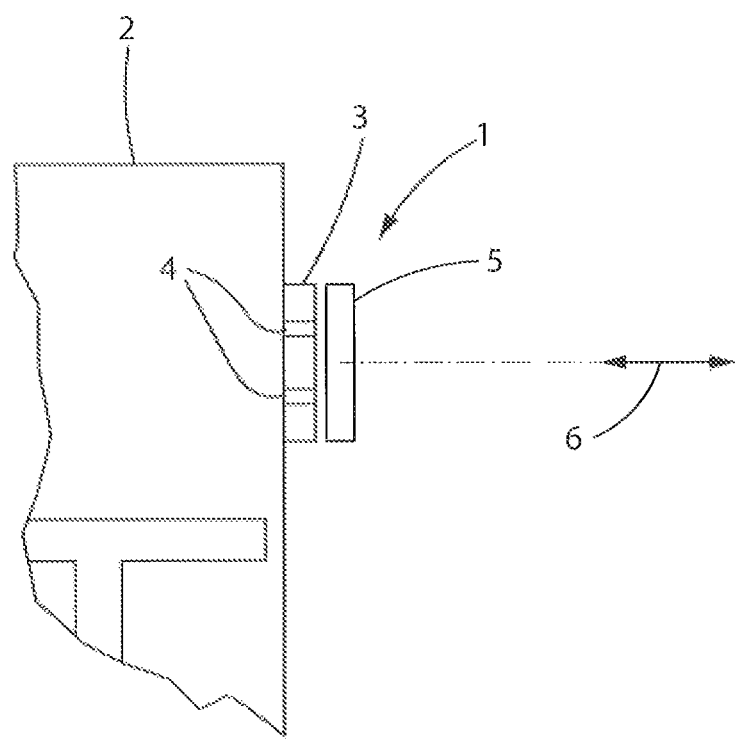

MATERIAL SUITABLE FOR THE MANUFACTURE OF VALVE SHUTTERS FOR THE CYLINDERS OF THE RECIPROCATING COMPRESSORS, AND VALVES THUS OBTAINED

The present invention has as its object valves installed on the cylinders of reciprocating compressors. More particularly, the invention relates to a material for the manufacture of said valves.

FIG. 1, attached hereto, shows diagrammatically and schematically the elements which comprise the current state of the art of which the present invention is an improvement.

In the current state of the art, valves, shown schematically at 1, which are normAy automatic valves, are installed on cylinders 2 of a reciprocating compressor. The valves 1 include a valve body 3, also referred to as a valve seat, which may be in the form of a plate having a plurality of flow channels 4 which may be formed concentric or non-concentric. The flow channels 4 are opened and closed by movement of an element 5, which can be referred to as a valve shutter, which movement is shown diagrammatically at arrow 6.

The opening and closing of said channels is performed by one or more elements, called shutters. The shape of said shutters is variable and normally identifies the valve. In disc valves for example the shutter is constituted by a single element in the shape of a disc, while in the ring valves by one or more concentric rings, in the poppet valves by poppet-shaped elements.

The shapes of these shutters, with the advent of plastics, over the years have evolved to better respond to the demand for reducing energy consumption. In the 1970s plastic shutters with convex profile adapted to improve the fluid dynamics of the compressed fluid spread throughout the market (See U.S. Pat. No. 3,536,094).

Moreover, always thanks to the introduction of plastics, benefits of reliability and safety, not obtainable with solutions in steel, have been reached.

To fully understand the problems the valve shutters for the reciprocating compressors are subject to, just think of the number of cycles they must support. If we consider a compressor that runs at 1000 revolutions per minute (rpm), the shutters close 16.6 times per second, and as many times they must open. If we consider a warranty required by the market of minimum 8000 hours (one year operation), it will get at least a minimum of 480 million cycles of opening and the same number of closing. In addition, it must be considered that the rotation threshold of the reciprocating compressor is constantly growing, and while in the 1970s was set around 600 rpm, today it has already exceeded 1000 rpm, reaching in specific applications 1800 rpm and for some cases even 3000 rpm.

If we add the new expectations required by the market of at least three years of continuous operation, we realize the criticality with which said elements must cope.

Finally, we should not forget the conditions to which said valves are subject, such as high pressures up to and in some cases beyond 500 bars), high temperatures (normally they must be able to ensure a resistance up to 200° C.), environment made of light gases ($H_2$, etc.) and heavy gases ($CO_2$, $C_2H_6$, etc.), aggressive gases ($H_2S$, $HCl$, etc.) and inert gases (Ar, He, etc.).

Despite continuing technological improvements made to the valves, the valve continues to remain one of the most critical elements of the reciprocating compressor. The updated statistics ascribe to the valves malfunction most of unscheduled shutdowns of the reciprocating compressors, and most of their malfunction is associable to premature failure of the valve shutters.

Among the thermoplastic matrices used for the production of valve shutters the principal are the following: polyamide PA66, polyether ether ketone (PEEK), polyether imide PEI, etc.

Normally all matrices commonly used provide reinforcements in glass or carbon fiber.

While the amorphous thermoplastics matrices, such as PES and PEI are characterized by high deformability and toughness, the semi-crystalline matrices (PEEK, PPS) are characterized by a better crack resistance, solvent resistance but less durability.

At the current state of the art, to try to increase the reliability of the valve shutters solutions have been also proposed which envisage the use of elastomers (see for example the patent application WO 03/006826) that if on the one hand ensure a better initial seal on the other are considerably more sensitive to impacts, prematurely losing initial benefits.

Always at the current state of the art, to try to improve the reliability of the shutters made from layers of carbon fibers impregnated in matrices of PEEK resin, epoxy resin, phenolic resin, etc., (see for example the patent EP 1 221 554) have been developed and patented. These shutters have high mechanical characteristics but require very complicated production processes in order to ensure the tightness of the valves. As well known, the quality and efficiency of a valve is related to the degree of tightness of its shutter, a characteristic strictly linked to mechanical and thermal characteristics.

Just to ensure tightness of the valves of the fiber shutters reinforcements were also provided of non-filled plastic or thermoplastic material, solutions that are not able to guarantee the requested reliability in time. Among other things, a shutter thus formed has major problems related to the connection of two materials (the outer elastomer, and the inner thermoplastic) whose thermal and mechanical characteristics are completely different.

Analysis performed on PEEK broken shutters show that the fracture mechanism appears to be a combination of plastic nature triggering followed by a brittle nature propagation.

From WO 2009/06 1989 A2 and WO 2007/146390 A2 nano-composite compositions are known comprising at least one thermoplastic polyamide and sepiolite particles having a particle size of less than 50 nm.

Purpose of the present invention is a valve shutter, characterized by a thermoplastic matrix consisting of polyether ether ketone (PEEK) or polyether imide (PEI) filled with glass or carbon fibers with the addition of one or more inorganic nano-composites, able to confer a significant gain in the breaking strain while maintaining the same breaking values.

In a very surprising way, it was discovered that it is possible to overcome the drawbacks of the known art, obtaining valve shutters having the characteristics of mechanical strength and superior durability, starting from a thermoplastic matrix consisting of PEEK or PEI filled with glass or carbon fibers, by the addition to the latter of one or more inorganic nano-composites, referring with said term to a multiphase solid material, where one of the phases has one, two or three dimensions less than 100 nanometers (nm).

It is therefore an object of the present invention a material for the manufacture of valve shutters for the cylinders of reciprocating compressors comprising a thermoplastic matrix consisting of PEEK or PEI filled with glass and/or carbon fibers comprising 4-30% of one or more inorganic nano-particles.

Further object of the present invention is a valve for the cylinders of reciprocating compressors whose shutters are manufactured by means of a composition of thermoplastic matrix consisting of PEEK or PEI filled with glass fibers (GF) and/or carbon fiber (CF) reinforced with from 4 to 30% of one or more inorganic nano-particles.

As thermoplastic matrices, the following compounds have proved suitable: polyether ether ketone (PEEK) polyether imide (PEI), polytetrafluoroethylene (PTFE).

Experimentally have been highlighted particularly positive contributions of some nano-fillers, such as wollastonite, metal oxides, nano carbon fibers (CNF), Sepiolite, mixtures of silica and alumina and fluorine-mica on a semi-crystalline matrix of PEEK filled with carbon and/or glass fibers.

The addition of these nano-particles (whose optimum contents is around 10%) implies a significant gain in the breaking strain of the valve shutters, while maintaining the same breaking values.

Below are reported the results of a comparison at a temperature of 200° C. between a basic formulation PEEK+ 30% CF and the new formulations with the addition of suitable nano-fillers.

EXAMPLE 1

In an extruder or injection molding machine with a temperature profile that reaches a maximum of 400° C. are introduced 60% parts by weight of PEEK+30% parts by weight of a CF filler+10% parts by weight of a wollastonite nano-filler.

The mixture thus obtained is injected into a mold at a temperature comprised between 175° C. and 205° C. The product obtained has the following characteristics:
Young's modulus, 6% more than the basic formulation
Tensile breaking load, virtually unchanged.
Breaking strain 50% more than the basic formulation

EXAMPLE 2

Using the same equipment as in Example 1, in the extruder or injection molding machine are introduced 60% parts by weight of PEEK+30% parts by weight of a CF filler+10% parts by weight of a fluorine-mica nano-filler. The mixture thus obtained is injected into a mold maintained at a temperature between 175° C. and 205° C. The product obtained has the following characteristics:
Young's modulus, virtually unchanged
Tensile breaking load, virtually unchanged.
Breaking strain 60% more than the basic formulation The addition of these nano-fillers leads to a gain of breaking strain maintaining the same breaking stress values and providing slight improvements in the module. The addition of these nano-fillers always leads to an increase of the Young's modulus.

The positive effects of nano-fillers normally occur maintaining unchanged the percentage of fiber and reducing the percentage of polymer matrix with the same percentage of nano-fillers introduced.

Although in the examples above preferably a PEEK polymeric matrix has been used, it is understood that the invention is not limited to this type of matrix, but it may also comprise a polyether-imide (PEI) matrix, and the like.

The invention claimed is:

1. A material for the manufacture of valve shutters for cylinders of reciprocating compressors comprising a thermoplastic matrix consisting of polyether ether ketone (PECK) or polyether imide (PEI) or mixtures thereof, filled with glass fiber, carbon fibers, or mixtures thereof; and 4-30% in percentages by weight of at least one of the following inorganic nano-particles, or a mixture thereof: 4-30% wollastonite, 4-30% of metal oxides, 4-30% of carbon nano-fibers, 4-30% of sepiolite, 4-30% of mixtures of sillica and alumina, 4-30% of floro-mica.

2. The material according to claim 1, wherein said thermoplastic matrix is semi-crystalline.

3. The material according to claim 1, wherein said metal oxides are selected from Ba, Ca, Mg, Cr, Mn, Fe, Ti oxides.

4. A valve for cylinders of reciprocating compressors, comprising a valve seat formed by a plate in which a plurality of flow channels are formed, cooperating with valve shutters that open or close said channels, said valve shutters comprising the thermoplastic matrix material of claim 1.

5. The valve for the cylinders of the reciprocating compressors according to claim 4, wherein the thermoplastic matrix material is semi-crystalline and the inorganic nano-particles comprise wollastonite in percentages from 4 to 30% by weight.

6. The valve fear the cylinders of the reciprocating compressors according to claim 4, wherein the thermoplastic matrix material is semi-crystalline and the inorganic nano-particles comprise metal oxides in percentages from 4 to 30% by weight.

7. The suitable valve for cylinders of the reciprocating compressors according to claim 4, wherein the thermoplastic matrix material is semi-crystalline and the inorganic nano-particles comprise carbon nano-fibers (CNF) in percentages from 4 to 30% by weight.

8. The suitable valve for cylinders of the reciprocating compressors according to claim 4, wherein the thermoplastic matrix material is semi-crystalline and the inorganic nano-particles comprise sepiolite nano-filler in percentages from 4 to 30% by weight.

9. The suitable valve for the cylinders of the reciprocating compressors according to claim 4, wherein the thermoplastic matrix material is semi-crystalline and the inorganic nano-particles comprise silica and alumina in percentages 4 from 30% by weight.

10. The suitable valve for the cylinders of the reciprocating compressor according to claim 4, wherein the thermoplastic matrix material is semi-crystalline and the inorganic nano-particles comprise fluoro-mica in percentages from 4 to 30% by weight.

11. The valve according to claim 5 wherein said thermoplastic matrix is selected from polyether ether ketone (PEEK) and polyether imide (PEI) or a mixture thereof.

12. The valve according to claim 6, wherein said metal oxides are Ba, Ca, Mg, Cr, Mn, Fe, Ti oxides.

13. A valve shutter for use in a reciprocating gas compressor valve comprising the material of claim 1.

* * * * *